(12) United States Patent
Jin et al.

(10) Patent No.: US 11,375,447 B2
(45) Date of Patent: Jun. 28, 2022

(54) DISPLAY DEVICE FOR IDENTIFYING COMMUNICATION METHOD BASED ON PRIORITY ORDER OF APPLICATION AND COMMUNICATION METHOD THEREOF

(71) Applicant: SAMSUNG ELECTRONICS CO., LTD., Suwon-si (KR)

(72) Inventors: Suhwan Jin, Suwon-si (KR); Seungil Yoon, Suwon-si (KR); Eungsik Yoon, Suwon-si (KR); Eunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/158,324

(22) Filed: Jan. 26, 2021

(65) Prior Publication Data

US 2021/0240342 A1 Aug. 5, 2021

(30) Foreign Application Priority Data

Feb. 5, 2020 (KR) .................... 10-2020-0013672

(51) Int. Cl.
*H04W 48/18* (2009.01)
*G06F 3/0482* (2013.01)
(Continued)

(52) U.S. Cl.
CPC .......... *H04W 48/18* (2013.01); *G06F 3/0482* (2013.01); *G06F 3/04886* (2013.01);
(Continued)

(58) Field of Classification Search
CPC .. G06F 3/04886; G06F 3/0482; G06F 1/3231; G06F 2203/04803; G06F 1/3265;
(Continued)

(56) References Cited

U.S. PATENT DOCUMENTS 7,113,765 B2    9/2006  Minear et al.
9,955,412 B2 *  4/2018  Weksler .............. H04L 12/5692
(Continued)

FOREIGN PATENT DOCUMENTS

JP    2016178356 A    10/2016
JP    6477040 B2      3/2019
(Continued)

OTHER PUBLICATIONS

GSA, 5G Device Ecosystem Report Mar. 2019, https://web.archive.org/web/20190402104051/https://gsacom.com/paper/5g-device-ecosystem-report-march-2019/, Apr. 2, 2019 (Year: 2019).*
(Continued)

*Primary Examiner* — Nicholas Ulrich
(74) *Attorney, Agent, or Firm* — Sughrue Mion, PLLC

(57) ABSTRACT

A method for controlling a display device includes storing a quality order for each of a plurality of communication methods different from each other, based on a plurality of applications being executed, identifying a priority order for each of the plurality of applications, identifying a communication method corresponding to each of the plurality of applications among the plurality of communication methods based on the priority order and the quality order, and communicating with a server corresponding to each of the plurality of applications by the identified communication method.

21 Claims, 9 Drawing Sheets

(51) Int. Cl.
    *G06F 3/04886*      (2022.01)
    *H04N 21/442*      (2011.01)
    *H04W 88/06*      (2009.01)
    *G06F 1/3231*      (2019.01)

(52) U.S. Cl.
    CPC ...... *H04N 21/44218* (2013.01); *H04W 88/06* (2013.01); *G06F 1/3231* (2013.01); *G06F 2203/04803* (2013.01)

(58) Field of Classification Search
    CPC ............ H04W 48/18; H04W 88/06; H04N 21/44218; H04N 21/4363; H04N 21/6106
    See application file for complete search history.

(56) References Cited

U.S. PATENT DOCUMENTS

| | | | | |
|---|---|---|---|---|
| 2008/0311912 | A1* | 12/2008 | Balasubramanian | H04W 48/18 455/436 |
| 2011/0250920 | A1* | 10/2011 | Shimizu | H04W 72/1215 455/512 |
| 2012/0077506 | A1* | 3/2012 | Wietfeldt | H04W 72/02 455/450 |
| 2016/0072674 | A1* | 3/2016 | Nolan | H04L 41/0816 709/221 |
| 2016/0191980 | A1* | 6/2016 | Yu | H04N 21/4316 725/40 |
| 2016/0261760 | A1 | 9/2016 | Aso et al. | |
| 2017/0310808 | A1* | 10/2017 | Hasegawa | H04M 1/724 |
| 2018/0317146 | A1 | 11/2018 | Fitzpatrick | |
| 2019/0014451 | A1 | 1/2019 | Moon et al. | |
| 2020/0314929 | A1 | 10/2020 | Nam et al. | |

FOREIGN PATENT DOCUMENTS

| | | |
|---|---|---|
| JP | 2020-14226 A | 1/2020 |
| KR | 10-1999-0009936 A | 2/1999 |
| KR | 10-2006-0027919 A | 3/2006 |
| KR | 101624355 B1 | 5/2016 |
| KR | 1020170081903 A | 7/2017 |
| KR | 10-2018-0020401 A | 2/2018 |
| KR | 10-2020-0007485 A | 1/2020 |
| KR | 10-2123352 B1 | 6/2020 |

OTHER PUBLICATIONS

Tortorello et al., MASCA: Management of Simultaneous Connectivity for Applications, IEEE, 2015 (Year: 2015).*

Tortorello et al., Android Application to Management Multiple Networking Interfaces, IEEE, 2015 (Year: 2015).*

International Search Report dated Apr. 29, 2021 issued by the International Searching Authority in counterpart International Application No. PCT/KR2021/000717 (PCT/ISA/210).

International Written Opinion dated Apr. 29, 2021 issued by the International Searching Authority in counterpart International Application No. PCT/KR2021/000717 (PCT/ISA/237).

* cited by examiner

DISPLAY DEVICE FOR IDENTIFYING COMMUNICATION METHOD BASED ON PRIORITY ORDER OF APPLICATION AND COMMUNICATION METHOD THEREOF

CROSS-REFERENCE TO RELATED APPLICATION

This application is based on and claims priority under 35 U.S.C. § 119 to Korean Patent Application No. 10-2020-0013672, filed on Feb. 5, 2020, in the Korean Intellectual Property Office, the disclosure of which is incorporated by reference herein in its entirety.

BACKGROUND

1. Field

The disclosure relates to a display device and a communication method thereof, and more particularly, a display device for performing communication by a communication method identified based on a quality order for each of communication methods and an operation priority order for each of applications, and a communication method thereof.

2. Description of Related Art

Along with the development of communication technologies, various communication methods are applied to a display device such as a TV. Particularly, in recent years, along with the development of 5G communication technology, various contents such as game contents are provided to a display device through the 5G communication method.

The 5G communication method is advantageous with its faster communication speed, compared to a communication method of the related art such as wired or Wi-Fi communication, however there is a problem regarding comparatively higher communication cost due to a large amount of data transmission.

When the display device supports various communication methods, if the communication method is adaptively changed according to a situation, instead of using only a specific communication method, the effective communication can be conducted while reducing communication cost. Accordingly, there is a need for a technology of performing the communication by adaptively changing the communication method.

SUMMARY

The disclosure is made in view of the above needs and is to provide an efficient communication method by suitably changing a communication method of a display device.

The technical problem of the disclosure is not limited to the technical problems described above and other technical problems not mentioned above may be clearly understood by those skilled in the art of the disclosure from the description below.

In accordance with an aspect of the disclosure, a method for controlling a display device includes storing a quality order for each of a plurality of communication methods different from each other, based on a plurality of applications being executed, identifying a priority order for each of the plurality of applications, identifying a communication method corresponding to each of the plurality of applications among the plurality of communication methods based on the priority order and the quality order, and communicating with a server corresponding to each of the plurality of applications by the identified communication method.

The method may further include based on one application among the plurality of applications being executed, performing communication by identifying a communication method corresponding to a communication specification required by the executed one application among the plurality of communication methods.

The priority order for each of the plurality of applications may be identified based on types of the applications.

The method may further include identifying whether a user of the display device is present within a preset range of the display device, based on the user being not present within the preset range from the display device, changing a first communication method of the plurality of communication methods corresponding to one application of the plurality of applications being executed to a second communication method of the plurality of communication methods, the second communication method having a communication quality order lower than a communication quality order of the first communication method, and performing communication by the second communication method.

The method may further include maintaining the first communication method based on the user being present within the preset range from the display device.

The identifying of the priority order for each of the plurality of applications may include providing a UI for selecting a menu, based on a multi-screen mode being selected from the UI, dividing an entire display region of a display into a plurality of display regions and displaying execution screens of the plurality of applications on the plurality of display regions, and identifying the priority order of each of the plurality of applications based on a size of each of the plurality of display regions.

The identifying of the priority order for each of the plurality of applications may include providing a UI for selecting a menu, based on a multi-screen mode being selected from the UI, dividing an entire display region of a display into a plurality of display regions and displaying execution screens of the plurality of applications on the plurality of display regions, and identifying the priority order of each of the plurality of applications based on a control authority applied to a display region among the plurality of display regions.

The identifying, based on the plurality of applications being executed, the priority order for each of the plurality of applications may include based on a first application of the plurality of applications being executed, performing communication by identifying a first communication method corresponding to a communication specification required by the executed first application among the plurality of communication methods, and based on a second application of the plurality of applications being additionally executed during the execution of the first application, comparing a priority order of the second application with a priority order of the first application being executed.

The plurality of communication methods may include at least one of 5G, LTE, wired Ethernet, or Wi-Fi, and the quality order may be determined according to at least one of a communication speed, stability, or communication cost.

In accordance with another aspect of the disclosure, a display device includes a plurality of communication modules different from each other, the plurality of communication modules corresponding to a plurality of communication methods, respectively, a memory configured to store at least one instruction, and a processor configured to control the plurality of communication modules by executing the at least one instruction, and the processor is configured to store a quality order for each of the plurality of communication modules in the memory, based on a plurality of applications being executed, identify a priority order for each of the plurality of applications, identify a communication method for each of the plurality of applications among the plurality of communication methods based on the priority order and the quality order, and control the plurality of communication modules to communicate with a server corresponding to each of the plurality of applications by the identified communication method.

The processor may be configured to, based on one application among the plurality of applications being executed, identify a communication method corresponding to a communication specification required by the executed one application among the plurality of communication methods, and perform communication by controlling a communication module corresponding to the identified communication method among the plurality of communication modules.

The processor may be configured to identify the priority order for each of the plurality of applications based on types of the applications.

The device may further include a sensor configured to detect a user of the display device where the processor is configured to, based on the user being not present within a preset range from the display device, change a first communication method of the plurality of communication methods corresponding to one application of the plurality of applications being executed to a second communication method of the plurality of communication methods, the second communication method having a communication quality order lower than a communication quality order of the first communication method, and perform communication by the second communication method.

The processor may be configured to maintain the first communication method based on the user being present within the preset range from the display device.

The device may further include a display and the processor may be configured to control the display to display a UI for selecting a menu, based on a multi-screen mode being selected from the UI, control the display to divide an entire display region of the display into a plurality of display regions and display execution screens of the plurality of applications on the plurality of display regions, and identify the priority order of each of the plurality of applications by comparing sizes of the plurality of display regions with each other.

The device may further include a display and the processor may be configured to control the display to display a UI for selecting a menu, based on a multi-screen mode being selected from the UI, control the display to divide an entire display region of the display into a plurality of display regions and to display execution screens of the plurality of applications on the plurality of display regions, and identify the priority order of each of the plurality of applications based on a control authority applied to a display region among the plurality of display regions.

The processor may be configured to, based on a first application of the plurality of applications being executed, perform communication by identifying a first communication method corresponding to a communication specification required by the executed first application among the plurality of communication methods, and based on a second application of the plurality of applications being additionally executed during the execution of the first application, compare a priority order of the second application with a priority order of the first application being executed, and determine a communication method of each of the first and second applications according to the comparison result.

The plurality of communication modules may include a connector configured to be connected to a dongle for 5G communication, a wired Ethernet module, and a Wi-Fi module, and the processor may be configured to, based on the dongle for 5G communication being connected to the connector, identify a quality order of each of a plurality of communication methods including a 5G communication method.

The plurality of communication methods may include at least one of 5G, LTE, wired Ethernet, or Wi-Fi, and the processor is configured to identify the quality order according to at least one of a communication speed, stability, or communication cost.

In accordance with another aspect of the disclosure, there is provided a computer program product comprising a non-transitory computer-readable recording medium having recording thereon a program for performing a communication method of a display device in which the method includes storing a quality order for each of a plurality of communication methods different from each other, based on a plurality of applications being executed, identifying a priority order for each of the plurality of applications, identifying a communication method corresponding to each of the plurality of applications among the plurality of communication methods based on the priority order and the quality order, and communicating with a server corresponding to each of the plurality of applications by the identified communication method.

The solution of the disclosure is not limited to the above solutions and solutions not mentioned above may be clearly understood by those skilled in the art of the disclosure from this specification and accompanying drawings.

According to the various aspects of the disclosure, it is possible to prevent reduction of throughput and occurrence of latency and reduce the communication cost by fluidly changing the communication method of the display device. Thus, it is possible to improve user's convenience and satisfaction.

In addition, effects predicted to be exhibited by the aspects of the disclosure will be described directly or implicitly in the description of embodiments of the disclosure. For example, various effects predicted according to the embodiments of the disclosure will be described in the description which will be described later.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
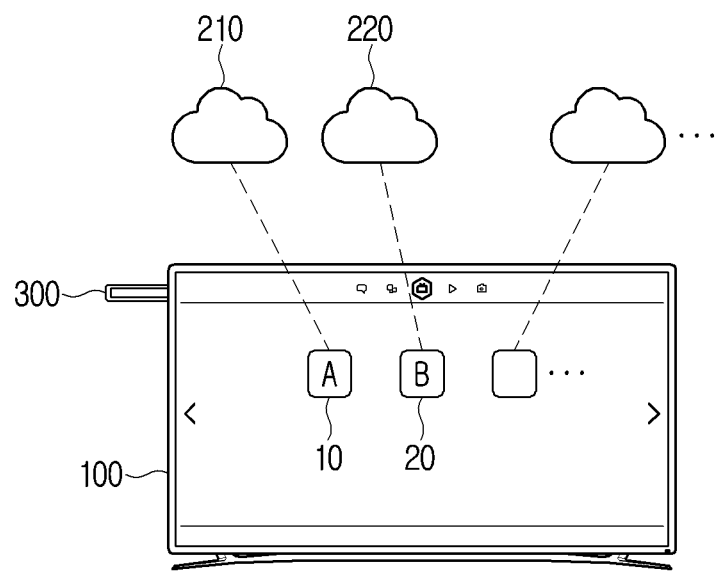
FIG. 1 is a diagram illustrating a communication method of a display device according to an embodiment.

The disclosure will be described in detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

Hereinafter, with reference to the accompanying drawings, embodiments of the disclosure will be described in detail. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a diagram illustrating a communication method of a display device according to an embodiment. A display 100 of FIG. 1 may support various communication methods. For example, the display device 100 may communicate with an external server with communication methods such as 5G (Generation), 4G, LTE, wired Ethernet, Wi-Fi, and the like. FIG. 1 illustrates that a 5G dongle 300 is connected to and used with the display device 100. When the 5G dongle 300 is connected to the display device 100, the display device 100 may support the 5G communication in addition to a communication method originally supported by the display device 100.

The display device 100 may grasp communication performance of each of communication methods and suitably select the communication method according to a situation. For example, if a high communication speed is necessary and a large amount of content is necessary to be received, the 5G communication method may be selected, and if an application that is sufficiently usable at a relatively lower communication speed is executed, the Wi-Fi, the wired Ethernet, and the like may be selected. The display device 100 may set a quality order of each of the communication methods, set a priority order regarding each of applications provided on the display device 100, and adaptively determine a communication method among the communication methods by considering the quality order and the priority order. The communication method may be determined when a user selects an application among the applications to be used.

Referring to FIG. 1, the display device 100 may display a user interface (UI) element regarding at least one application.

For example, the display device 100 may provide a web browsing application, a video watching application, a game application, a video calling application, a camera application, and the like. The display device 100 may provide a UI element regarding each of the applications.

FIG. 1 illustrates that the display device 100 displays a first UI element 10 corresponding to an application A and a second UI element 20 corresponding to an application B. Each of the first and second UI elements 10 and 20 may be an icon regarding each application and a text or a thumbnail image representing an application name.

When the display device 100 obtains a user command (remote controller signal, touch, voice input, motion input, and the like) for selecting one of these UI elements, the display device 100 may communicate with an external server corresponding to the application of the selected UI element and receive data regarding the application from the external server. The display device 100 may display a content corresponding to the data received from the external server. For example, if the application A corresponding to the first UI element 10 is an application for a video providing website, when a user selects the first UI element 10, the display 100 may communicate with a first server 210 for providing the video providing website and display the video providing website. When the user selects one video content from the website, the display device 100 may receive the selected video content from the first server 210 and display the video content.

The display device 100 may store a quality order for each of the communication methods. The quality order may refer to a priority order determined by comparing the communication methods with each other. The priority order is not determined only based on the communication quality and may be determined according to various criteria. For example, if a communication quality speed is determined based on a communication speed, the 5G may have first priority and the wired Ethernet may have second priority. In another example, if the communication quality speed is determined based on communication cost, the wired Ethernet may have first priority and the 5G may have second priority. In addition, the communication quality order may be determined based on communication safety.

The display device 100 may identify the communication method corresponding to each of the applications and communicate with the external server by the identified communication method. The display device 100 may identify a communication method corresponding to each of the applications based on the communication quality order and a necessary communication specification required for the execution of each of the applications. For example, if the communication specification with a maximum transmission speed of 3 Gbps is required for execution of the game application, the display device 100 may identify the 5G communication method satisfying the communication specification and communicate with the external server. In another example, if the communication specification with a speed of 100 Mbps is required for execution of the video watching application and both the 5G and the wired Ethernet satisfy the corresponding communication specification, the display device 100 may identify the wired Ethernet with the higher priority based on the communication cost and communicate with the external server.

In addition, in accordance with the user's selection, the display device 100 may execute a plurality of applications at the same time. In FIG. 1, when both of the application A and the application B are selected, the display 100 may communicate with each of the first server 210 and the second server 220. The display device 100 may identify an operation priority order for each of the applications and identify a communication method corresponding to each of the applications based on the identified priority order. For example, the display device 100 may identify a communication method with a relatively higher quality, as a communication method regarding an application with a relatively higher operation priority order. In addition, when a total data usage is identified to be equal to or greater than a predetermined range, the display device 100 may perform the communication by changing a communication method with a server regarding an application being executed to a communication method with a lower quality order. As described above, the display device 100 may perform the communication by adaptively changing the communication method according to various situations.

Meanwhile, if a plurality of applications are executed at the same time, a display device of the related art communicates with an external server only by a single communication method set by a user or a manufacturer, and accordingly, there was a problem regarding reduction of throughput or occurrence of latency according to an increase in data usage. In contrast, according to the display device 100 of the disclosure, the communication may be efficiently performed by adaptively changing the communication method according to various situations, and accordingly, a problem occurring on the display device of the related art may be prevented.

Meanwhile, in FIG. 1, it is assumed that a communication device 300 such as the 5G dongle is connected to a connector of the display device 100 and used, but there is no limitation thereto. In other words, a 5G communication chip may be separately provided and embedded and used in the display device 100, in the same manner as a Wi-Fi module or a wired Ethernet module.

Hereinabove, the communication method of the display device according to the disclosure has been briefly described. Hereinafter, the configuration of the display device according to an embodiment of the disclosure will be described.

Figure 2:
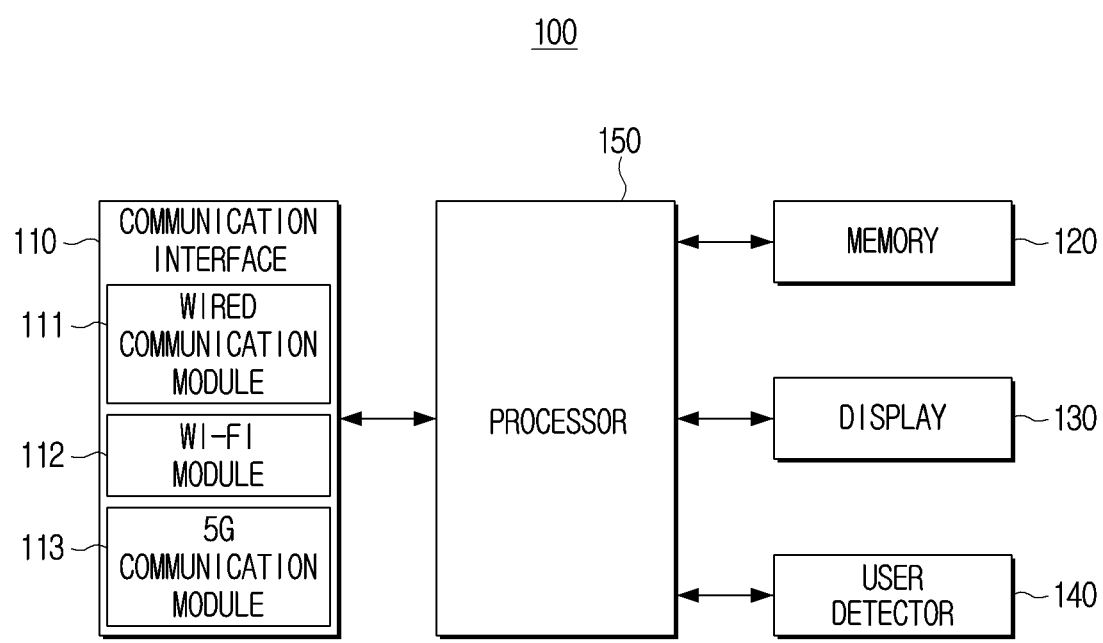
FIG. 2 is a block diagram illustrating a configuration of a display device according to an embodiment.

FIG. 2 is a block diagram illustrating a configuration of a display device according to an embodiment. The display 100 may be implemented as a TV, a monitor, a large-sized screen, a user terminal, and the like.

Referring to FIG. 2, it is illustrated that the display device 100 includes a communication interface 110, a memory 120, a display 130, a user detector 140, and a processor 150, but some elements may be omitted, added, or replaced with other elements according to an embodiment.

The communication interface 110 may include at least one circuitry and communicate with various types of external devices. The communication interface 110 may include a wired communication module 111 such as a local area network (LAN). The wired communication module 111 may include a wired Ethernet interface. In addition, the communication interface 110 may include a wireless communication module. The communication interface 110 may include at least one of a Wi-Fi module 112 and a 5G communication module 113. In addition, according to an embodiment, the communication interface 110 may include at least one of a Bluetooth communication module, a cellular communication module, and a $4^{th}$ generation long term evolution (LTE) communication module.

The memory 120 may store an operating system (OS) for controlling general operations of elements of the display device 100 and an instruction or data related to the elements of the display device 100. For this, the memory 120 may be implemented as a non-volatile memory (e.g., a hard disk drive, a solid state drive (SSD), and a flash memory), a volatile memory, and the like. In an embodiment according to the disclosure, the memory 120 may store the communication quality order for each of the communication methods. The processor 150 may identify the communication method for execution of an application based on the communication quality order stored in the memory 120.

The display 130 may display various screens under the control of the processor 150.

The processor 150 may control the display 130 to display a home screen, when the display device 100 is turned on. An initial screen may include a UI element corresponding to each of a plurality of applications supported by the display device 100.

In addition, the processor 150 may control the display 130 to display a screen including a UI element corresponding to each of the plurality of applications when a menu button is pressed on a remote controller or a user inputs a specific voice signal or a motion signal. The screen may also include a UI element for selecting, not only various applications, but also an operation mode of the display device 100. For example, the screen may include a UI element corresponding to a multi-screen mode.

When it is determined that the multi-screen mode is selected, the processor 150 may control the display 130 to divide the entire display region into a plurality of regions and display screens different from each other in each of the plurality of regions. When the plurality of applications are selected, the processor 150 may control the display 130 to display execution screens of each of the applications in regions different from each other.

The display 130 may be implemented as a liquid crystal display (LCD) panel, an organic light emitting diode (OLED), and the like. In some cases, the display 130 may be implemented as a flexible display or a transparent display.

The user detector 140 may be an element for detecting a user around the display device 100. For example, the user detector 140 may be implemented as a camera, a laser sensor, a Lidar sensor, an optical sensor, and the like. The processor 150 may detect a user based on information regarding the surrounding of the display device 100 obtained by the user detector 140.

The processor 150 may identify the communication method of the display device 100 based on whether a user is detected or not. When the processor 150 communicating with the external server detects that there is no user around the display device 100, the processor 150 may communicate with the external server by changing the communication method to a communication method with a lower communication quality than the current communication method.

The processor 150 may control general operations of the display device 100. For example, the processor 150 may obtain the communication quality order for each of the communication methods supported by the display device 100 and store the communication quality order in the memory 120. The processor 150 may obtain throughput or latency for each of the communication methods in an environment where the display device 100 is installed, and obtain the communication quality order for each of the communication methods.

When the plurality of applications are executed, the processor 150 may identify the priority order of each of the applications. At this time, the processor 150 may control the display 130 to display a UI for selecting a menu including the multi-screen mode of the display 130. When the multi-screen mode is selected from the displayed UI and the application is selected for each display region, the processor 150 may execute the selected application. At this time, the processor 150 may identify the priority order of the application based on a size of each display region. Specifically, the processor 150 may identify an application displayed in a relatively larger display region as the application with a higher priority order. In addition, the processor 150 may identify a priority order of an application corresponding to a display region applied with control authority among the plurality of display regions as a high priority order. Meanwhile, when another application is additionally executed during the execution of the application, the processor 150 may identify the priority order of each application by comparing the priority orders of the application being executed and the other application.

Meanwhile, the processor 150 may identify the communication method corresponding to each of the applications based on the priority order identified for each of the applications and the communication quality order. The processor 150 may communicate with a server corresponding to each of the applications by the identified communication method. For example, the processor 150 may communicate with an external server corresponding to an application with a relatively higher priority order by a communication method having a relatively higher communication quality. On the other hand, the processor 150 may communicate with an external server corresponding to an application with a relatively lower priority order by a communication method having a relatively lower communication quality.

Meanwhile, the display device 100 may communicate with the external server by using a communication channel formed by the communication device 300 described above.

Figure 3:
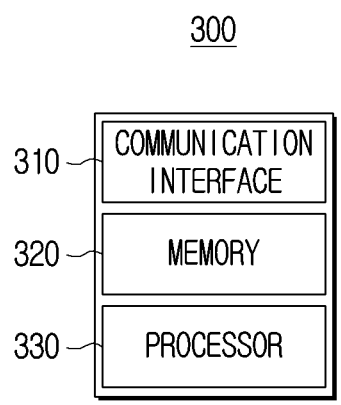
FIG. 3 is a block diagram illustrating a configuration of a communication device according to an embodiment.

FIG. 3 is a block diagram illustrating a configuration of a communication device according to an embodiment.

Referring to FIG. 3, the communication device 300 may include a communication interface 310, a memory 320, and a processor 330. The communication device 300 may communicate with the display device 100 via the communication interface 310. The communication device 300 may communicate with an external server via the communication interface 310. The communication interface 310 may be implemented to be connected to a USB port.

In addition, the communication device 300 may include the memory 320 including at least one instruction and the processor 330 for controlling each element of the communication device 300. When the communication device 300 is connected to the display device 100, the communication device 300 may form a communication channel in 5G frequency band (e.g., 3.5 GHz or 28 GHz). The display device 100 may communicate with an external server via the communication device 300 by using a communication channel in 5G communication frequency band.

When the communication device 300 is implemented with no internal battery, the communication device 300 may be turned on and operated by a power supplied by the display device 100 when the communication device 300 is connected to the display deice 100. When the communication device 300 is implemented with an internal battery and an on/off switch, the communication device 300 may connect 5G communication frequency channel in a state where the communication device 300 is turned on by switch manipulation of the user.

Hereinafter, the communication method of the display device according to various embodiments of the disclosure will be described with reference to the drawings.

Figure 4A:
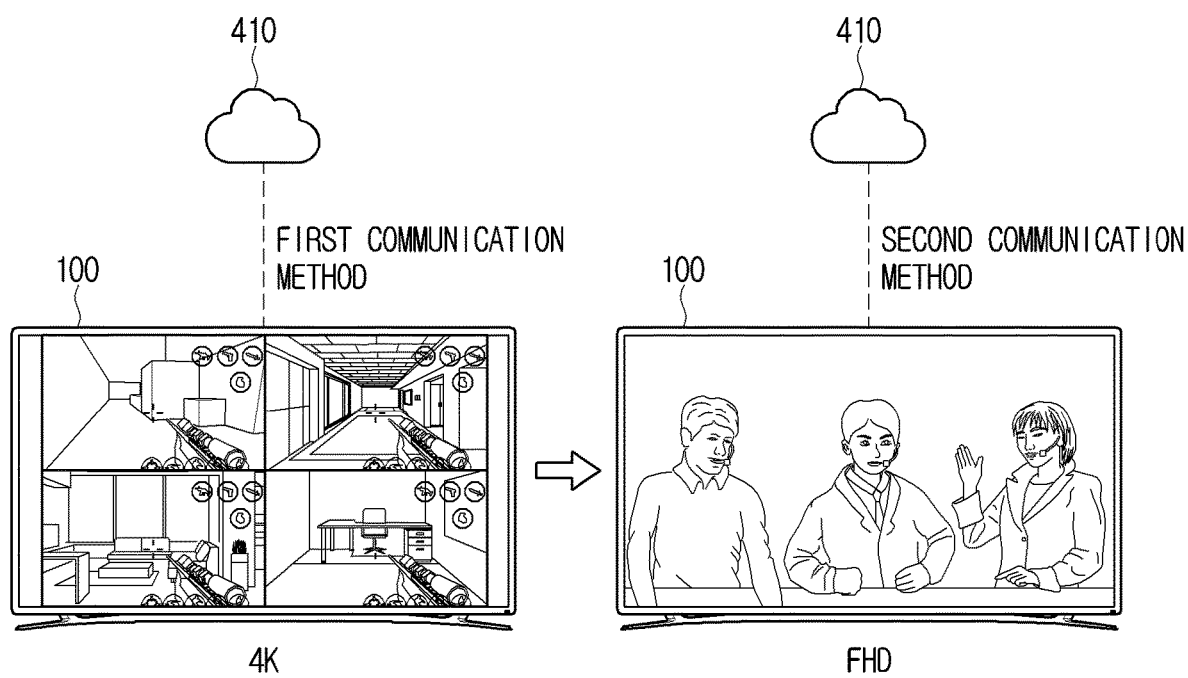
FIG. 4A is a diagram illustrating a communication method of a display device according to an embodiment operating in a single screen mode.
Figure 4B:
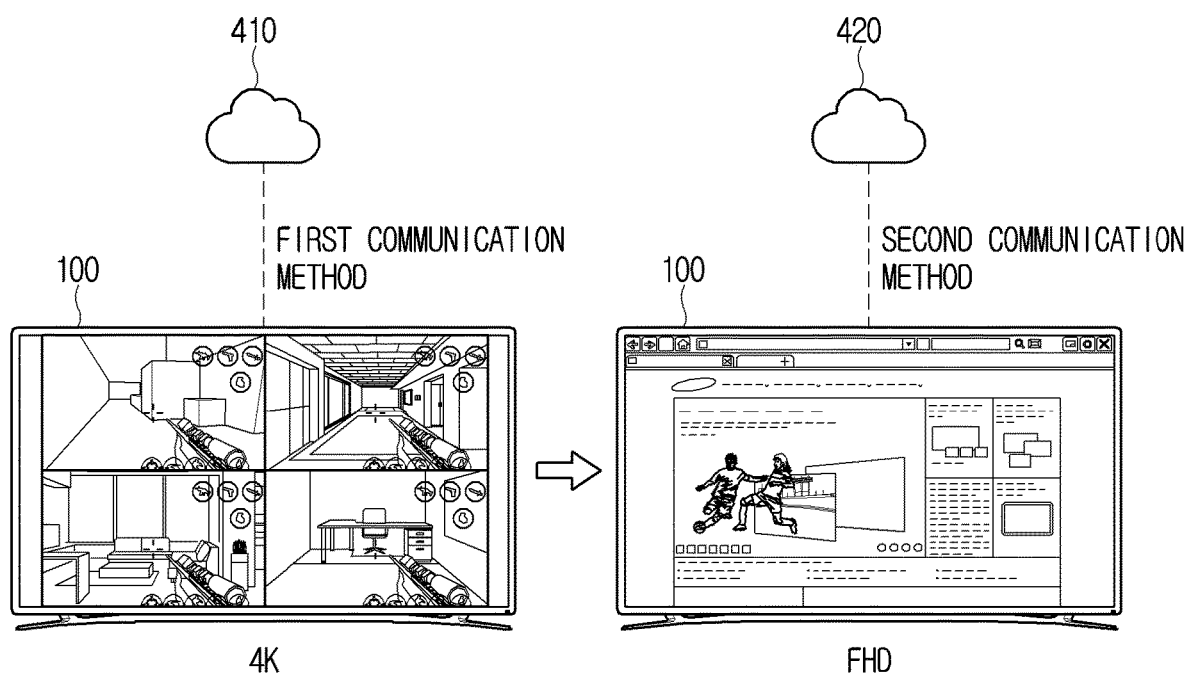
FIG. 4B is a diagram illustrating a communication method of a display device according to another embodiment operating in a single screen mode.

FIGS. 4A and 4B are diagrams illustrating a communication method of a display device operating in a single screen mode.

Referring to FIG. 4A, the display device 100 may execute a first application. The first application may be an application for watching of a live streaming content. When the first application is executed, the display device 100 may communicate with a first server 410 for providing a content of the first application. When the display device 100 obtains a user command for executing a first image content having 4K resolution among contents of the first server 410, the display device 100 may receive image data corresponding to the first image content having 4K resolution by communicating with the first server 410. In addition, the display device 100 may display the first image content with 4K resolution. For example, the first image content may be a live streaming content related to various sports games such as e-sports. However, this is merely an embodiment, and the first image content may be a live streaming content related to a concert of a singer. In addition, the display device 100 may be disposed at a location where a sports game or a concert is played to provide a real-time screen regarding the sports game or the concert to spectators or audiences.

Meanwhile, the display device 100 may communicate with the first server 410 by a first communication method. At this time, the display device 100 may identify the first communication method among a plurality of communication methods based on the communication specification required for the execution of the first application. The first communication method herein may refer to the 5G communication method. In other words, the 5G communication method may be required in order to receive and display the first image content with 4K resolution in real time. Accordingly, the display device 100 may communicate with the first server 410 by the 5G communication method to receive and display the first image content with 4K resolution in real time. Meanwhile, the display device of the related art was not able to perform the 5G communication. Accordingly, there was a problem of occurrence of latency when displaying the real-time streaming content with 4K resolution. In contrast, since the display device 100 according to the disclosure is able to perform the 5G communication, the display device 100 may display the live streaming content with 4K resolution in real time.

Meanwhile, the display device 100 may change the communication method for receiving the first image content based on a content attribute included in the first image content. Specifically, the display device 100 may communicate with the first server 410 while keeping the first communication method in order to receive a scene where 4K resolution is necessary for smooth viewing of a user or due to a high degree of interest of a user (e.g., a screen for gamers in e-sports games) among contents included in the first image content. In contrast, when receiving a scene with a relatively lower degree of interest of the user (e.g., a screen regarding a commentator of the e-sports game) among the contents included in the first image content, the display device 100 may communicate with the first server 410 by changing the first communication method to a second communication method (e.g., wired Ethernet or Wi-Fi) with a lower quality order than the first communication method in terms of the communication speed.

The processor 150 may monitor a change in size of video data while reproducing the first image content, and when it is determined that the size of the video data is reduced to a certain level or lower, the processor 150 may change the communication method to the second communication method.

As descried above, the display device 100 may communicate with the server by changing the communication method according to a situation even when one application is being executed. Meanwhile, when the display device 100 obtains a user command for changing the application, the display device 100 may communicate with a server corresponding to the changed application. The display device 100 may perform the communication by changing the communication method in response to the change of the application, and accordingly, hereinafter, this will be described in more detail with reference to FIG. 4B.

FIG. 4B is a diagram illustrating a communication method of a display device according to another embodiment.

As described above, the display device 100 may communicate with the first server 410 corresponding to the first application by the first communication method and receive the first image content having 4K resolution. The display device 100 may display the received first image content.

Meanwhile, when the display device 100 obtains a user command for executing a second application (e.g., a web browsing application) while the first image content is being displayed, the display device 100 may identify the second communication method corresponding to the second application. The second communication method corresponding to the second application may be determined in advance by a user or a manufacturer of the display device 100. For example, the second communication method may be determined as the wired Ethernet or Wi-Fi.

In addition, the display device 100 may identify the second communication method based on the communication specification required for the execution of the second application and the communication quality order for each of the communication methods stored in the memory 120. Specifically, a downloading speed of 100. Mbps may be required as the communication specification, in order to execute the second application, and all of the 5G, the wired Ethernet, and the Wi-Fi may satisfy the communication specification. The display device 100 may identify the wired Ethernet or Wi-Fi which is advantageous in terms of cost, compared to 5G, as the second communication method. The display device 100 may communicate with a second server 420 corresponding to the second application by the identified second communication method to receive a second image content having FHD image quality (e.g., a web page screen). In addition, the display device 100 may display the received second image content. As described above, when the application to be executed is changed, the display device 100 may identify the communication method suitable for the changed application to communicate with the server by the identified communication method. Accordingly, the display device 100 may prevent unnecessary communication cost.

Meanwhile, the display device 100 may identify the communication method based on the features of the application. For example, the display device 100 may identify the 5G by the communication method regarding the application for providing a real-time video content and identify the wired Ethernet or Wi-Fi by the communication method regarding the web browsing application. The communication method corresponding to each of the applications may be stored in the memory 120.

Figure 5A:
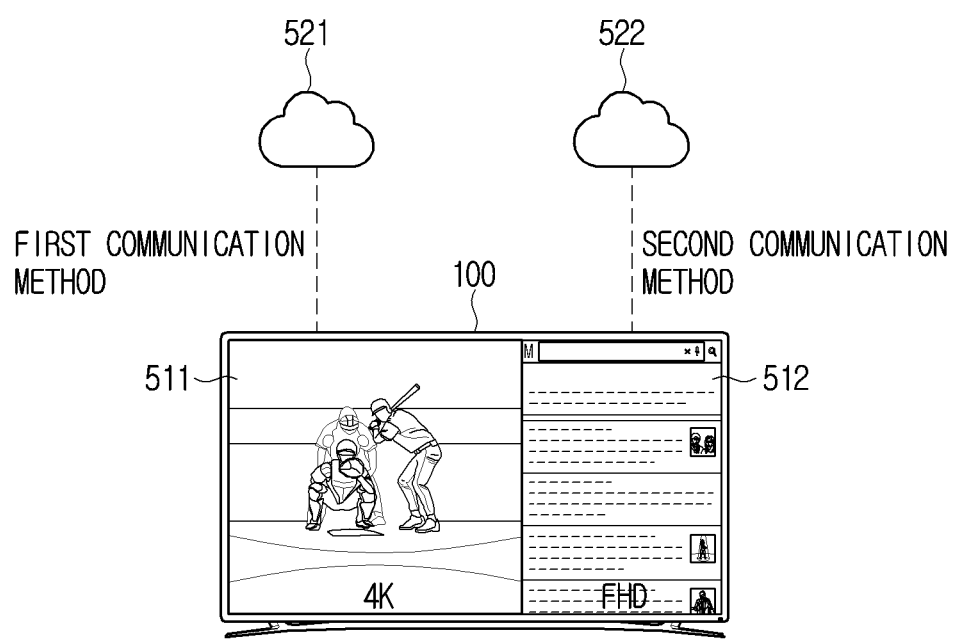
FIG. 5A is a diagram illustrating a communication method of a display device according to an embodiment operating in a multi-screen mode.

FIG. 5A is a diagram illustrating a communication method of a display device according to still another embodiment. Specifically, FIG. 5A is a diagram illustrating a state of the display device 100 operating in a multi-screen mode.

The display device 100 may display a first display region 511 and a second display region 512. In addition, the display device 100 may display an execution screen of an application being executed in each display region of the first display region 511 and the second display region 512. Specifically, the display device 100 may display the execution screen of the first application with 4K resolution in the first display region 511. In addition, the display device 100 may display the execution screen of the second application with FHD resolution in the second display region 512. For example, the first application may be an application for providing a live streaming content regarding a sports game and the second application may be an application for providing a web page.

Meanwhile, the display device 100 may display a UI for selecting an operation mode (e.g., a multi-screen mode or a single screen mode) of the display device 100. In addition, when the operation mode of the display device 100 is selected and the application is selected from the displayed UI by the user command, the display device 100 may execute the selected application.

Meanwhile, the display device 100 may identify a communication method corresponding to an application to be executed in a display region and communicate with the server corresponding to the application by the identified communication method. The display device 100 may identify the communication method based on the operation priority order of the application. Specifically, the display device 100 may identify the communication method with a high quality order in order to communicate with the server corresponding to the application with a high operation priority order among the plurality of applications. The display device 100 may identify the communication method with a low quality order in order to communicate with the server corresponding to an application with a relatively low operation priority order. For example, when the operation priority order of the first application is higher than the operation priority order of the second application, the display device 100 may identify the first communication method (e.g., 5G) by the communication method regarding the first application and identify the second communication method (e.g., wired Ethernet or Wi-Fi) by the communication method regarding the second application.

The display device 100 may communicate with the external server by the communication method identified as described above. Specifically, the display device 100 may communicate with a first server 521 by the first communication method and communicate with a second server 522 by the second communication method.

Meanwhile, the operation priority order of each of the applications may be determined based on various criteria. Specifically, the operation priority order of the application may be determined based on a size of the display region. For example, the operation priority order of the first application executed in the relatively larger first display region 511 may be higher than the operation priority order of the second application executed in the second display region 512. In addition, the operation priority order of the application may be changed according to the user command for adjusting the size of the display region. For example, when the user command for adjusting the size of the second display region 512 to be larger than the size of the first display region 511 is obtained and the size of the second display region 512 becomes larger than the size of the first display region 511, the operation priority order of the second application may be higher than the operation priority order of the first application.

In addition, the operation priority order of each of the applications to be executed in the display region applied with control authority may be higher than that of the application executed in the remaining display region. For example, although the size of the first display region 511 is larger than the size of the second display region 512, if the control authority is applied to the second display region 512, the operation priority order of the second application may be higher than the operation priority order of the first application.

The operation priority order of each of the applications may be determined based on the features of the application. For example, the operation priority order of the application for providing the image content may be higher than the operation priority order of the application for providing a web page.

Meanwhile, the display device 100 may identify a main display region and a sub-display region based on the operation priority order of each application. Herein, the operation priority order of the main display region may be higher than the operation priority order of the sub-display region. For example, the first display region 511 may be identified as the main display region and the second display region 512 may be identified as the sub-display region.

FIG. 5A illustrates a case where the communication methods regarding the first application and the second application are different from each other, but this is merely an embodiment, and the communication methods regarding the first application and the second application may be the same as each other. For example, both the first communication method and the second communication method may be the wired Ethernet.

Figure 5B:
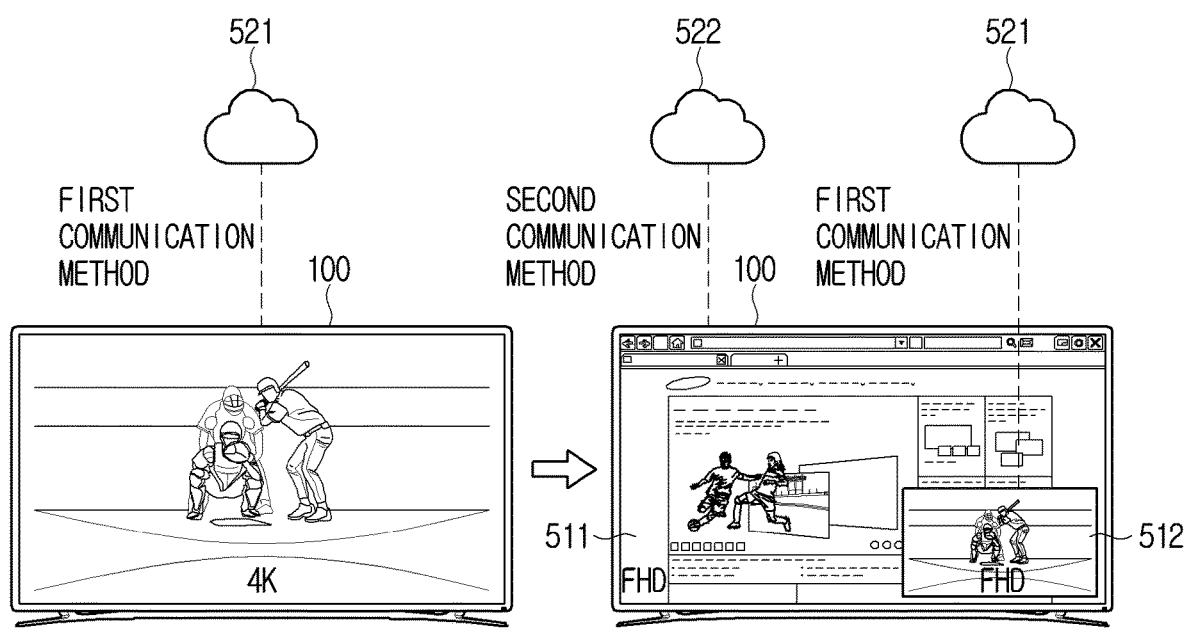
FIG. 5B is a diagram illustrating a communication method of a display device according to another embodiment operating in a multi-screen mode.

FIG. 5B is a diagram illustrating a communication method of a display device according to another embodiment. Specifically, FIG. 5B is a diagram illustrating an embodiment in which another application is additionally executed during the execution of one application by the display device.

Referring to FIG. 5B, the display device 100 may execute the first application in a single mode and display the execution screen of the first application. When the display device 100 obtains a user command for additionally executing the second application in addition to the first application during the execution of the first application, the display device 100 may enter a multi-screen mode. The display device 100 may display execution screens of the first application and the second application in respective display regions. For example, the display device 100 may display the execution screen of the first application in the second display region 512 and display the execution screen of the second application in the first display region 511. Herein, the first display region 511 may be the main display region and the second display region 512 may be the sub-display region.

As described above, when an application is additionally executed according to the user command, the user may pay attention to the additionally executed application than the application being executed in advance. Accordingly, the display device 100 may identify that the operation priority order of the additionally executed second application is higher than the operation priority order of the first application being executed in advance. The display device 100 may display the execution screen regarding the second application in the first display region 511 which is the main display region. In addition, the display device 100 may display the execution screen regarding the first application with a relatively lower operation priority order in the second display region 512 which is the sub-display region.

In addition, the display device 100 may reset the communication method based on the operation priority order for each application. Specifically, the display device 100 may perform the communication by the first communication method (e.g., 5G) for display in the single-screen mode with 4K resolution, and then perform the communication by the second communication method (e.g., wired Ethernet or Wi-Fi) for display with FHD resolution after entering the multi-screen mode. As described above, a degree of interest of the user regarding the first application being executed in advance may be lower than a degree of interest regarding the second application newly executed. Accordingly, the display device 100 may communicate with the first server 521 by changing the communication method to the second communication method with a communication quality order lower than that of the first communication method. Thus, the display device 100 may save the communication cost incurred due to the communication according to the first communication method.

Meanwhile, FIG. 5B illustrates that the application executed later is displayed in the main display region, but this is merely an embodiment, and the application may be displayed in the sub-display region. For example, the display device 100 may display the execution screen regarding the first application in the first display region 511 which is the main display region when entering the multi-screen mode.

In addition, FIGS. 5A and 5B illustrate that the types of the applications displayed in the first display region and the second display region are different from each other, but this is merely an embodiment and the types of the applications displayed in the display regions may be the same as each other. For example, both the first display region and the second display region may display the video watching application.

Figure 6:
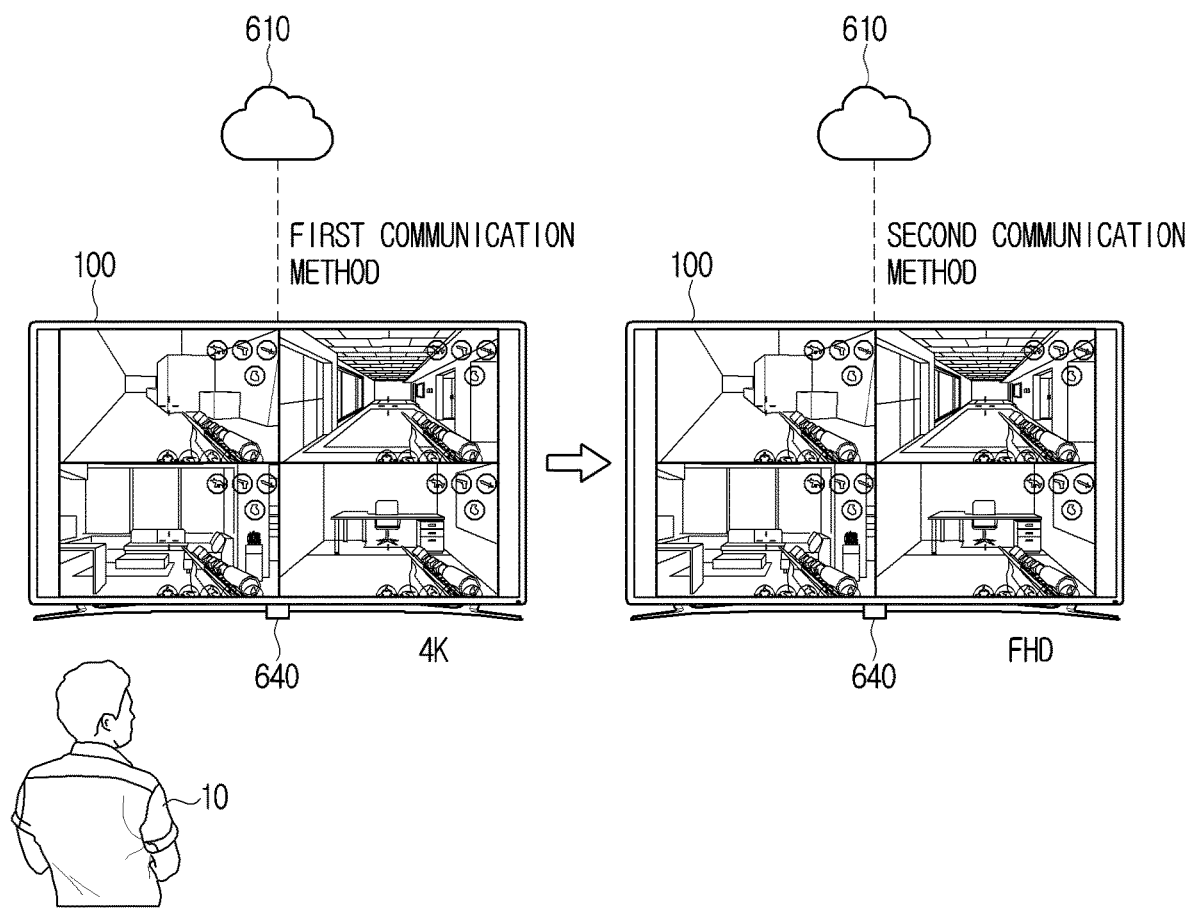
FIG. 6 is a diagram illustrating a communication method of a display device according to detection of presence or absence of a user.

FIG. 6 is a diagram illustrating a communication method of a display device according to still another embodiment. Specifically, the display device 100 may detect whether the user is present in the surrounding of the display device 100 and identify the communication method for receiving data regarding the application from the server based on the detected result.

As illustrated in FIG. 6, when it is identified that a user 10 is positioned within a preset range from the display device 100, the display device 100 may communicate with a first server 610 by the first communication method to receive and display an image content with 4K resolution. On the other hand, when it is identified that the user 10 is not positioned within the preset range from the display device 100, the display device 100 may change the first communication method to the second communication method with a communication quality order lower than that of the first communication method. In addition, the display device 100 may communicate with the first server 610 by the second communication method to receive and display an image content with FHD resolution. This is because that although the user 10 is not positioned within the preset range from the display device 100, the unnecessary communication cost may incur, if the communication is performed by the first communication method (e.g., 5G). The display device 100 according to the disclosure may prevent unnecessary communication cost by adaptively changing the communication method according to whether the user is present within the preset range.

Meanwhile, in order to identify whether the user 10 is positioned within the preset range from the display device 100, the display device 100 may detect the user around the display device through a user detector 640. FIG. 6 illustrates that the user detector 640 is provided on a lower end of the display device 100, but this is merely an embodiment, and an installation position of the user detector 640 is not limited to a specific position.

Figure 7:
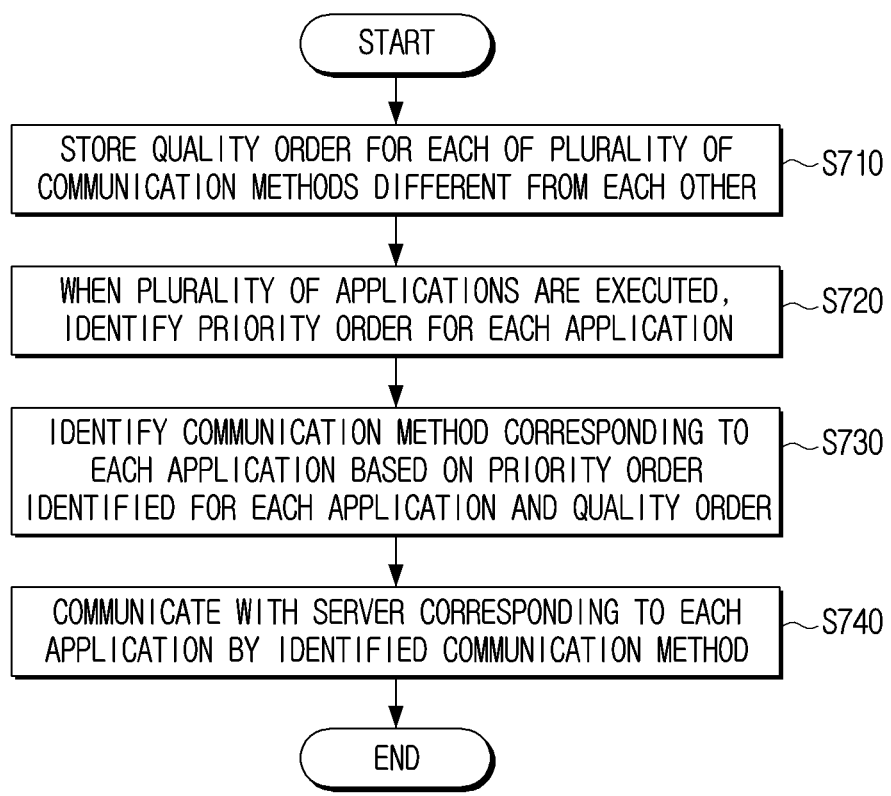
FIG. 7 is a flowchart illustrating a communication method of a display device according to an embodiment.

FIG. 7 is a flowchart illustrating a communication method of a display device according to an embodiment.

The display device 100 may support a plurality of communication methods different from each other and store the quality order of each of the communication methods different from each other (S710). The display device 100 may obtain the quality order of each of the communication methods by measuring throughput or latency and store the quality order in the memory. For example, the quality order may be stored so that 5G has first priority, the wired Ethernet has second priority, and Wi-Fi has third priority.

In addition, when the plurality of applications are executed, the display device 100 may identify the priority order of each of the applications (S720). At this time, the display device 100 may identify the operation priority order of each of the applications based on the sizes of the plurality of display regions corresponding to the plurality of applications. For example, as the size of the display region is large, the display device 100 may identify that the operation priority order of the application executed in the corresponding display region is high.

In addition, the display device 100 may communicate with the server corresponding to each of the applications by the identified communication method (S740). In addition, the display device 100 may display image data received via the communication method.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

The machine-readable storage medium may be provided in a form of a non-transitory storage medium. Here, the "non-transitory storage medium" is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product may be at least temporarily stored or temporarily generated in a machine-readable storage medium such as a memory of a server of a manufacturer, a server of an application store, or a relay server.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method for controlling a display device, the method comprising:
   storing a quality order for each of a plurality of communication methods different from each other;
   based on a plurality of applications being executed at the same time, identifying a priority order for each of the plurality of applications, wherein the plurality of applications include a first application with a first priority and a second application with a second priority lower than the first priority;
   identifying a communication method corresponding to each of the plurality of applications among the plurality of communication methods based on the priority order and the quality order; and
   communicating with a server corresponding to each of the plurality of applications by the identified communication method,
   wherein the communicating with the server comprises communicating with the server by one communication method among the plurality of communication methods, wherein the method further comprises, based on whether a user of the display device is present within a preset range of the display device, changing the one communication method to another communication method among the plurality of communication methods, and wherein the identifying of the communication method comprises:

identifying a first communication method corresponding to the first application among the plurality of communication methods, the first communication method having a first quality, and identifying a second communication method corresponding to the second application among the plurality of communication methods, the second communication method having a second quality lower than the first quality.

2. The method according to claim 1, further comprising:
based on one application among the plurality of applications being executed, performing communication by identifying a communication method corresponding to a communication specification required by the executed one application among the plurality of communication methods.

3. The method according to claim 1, where the priority order for each of the plurality of applications is identified based on types of the applications.

4. The method according to claim 1,
wherein the changing of the one communication method comprises:
identifying whether the user of the display device is present within the preset range of the display device; and
based on the user being not present within the preset range from the display device, changing the one communication method of the plurality of communication methods to the another communication method of the plurality of communication methods, and
wherein a quality order of the another communication method is lower than a quality order of the one communication method.

5. The method according to claim 4, further comprising maintaining the one communication method based on the user being present within the preset range from the display device.

6. The method according to claim 1, wherein the identifying of the priority order for each of the plurality of applications comprises:
providing a UI for selecting a menu;
based on a multi-screen mode being selected from the UI, dividing an entire display region of a display into a plurality of display regions and displaying execution screens of the plurality of applications on the plurality of display regions; and
identifying the priority order of each of the plurality of applications based on a size of each of the plurality of display regions.

7. The method according to claim 1, wherein the identifying of the priority order for each of the plurality of applications comprises:
providing a UI for selecting a menu;
based on a multi-screen mode being selected from the UI, dividing an entire display region of a display into a plurality of display regions and displaying execution screens of the plurality of applications on the plurality of display regions; and identifying the priority order of each of the plurality of applications based on a control authority applied to a display region among the plurality of display regions.

8. The method according to claim 1, wherein the identifying, based on the plurality of applications being executed, the priority order for each of the plurality of applications comprises:
based on one application of the plurality of applications being executed, performing communication by identifying a communication method corresponding to a communication specification required by the executed one application among the plurality of communication methods; and
based on another application of the plurality of applications being additionally executed during the execution of the one application, comparing a priority order of the another application with a priority order of the one application being executed.

9. The method according to claim 1, wherein the plurality of communication methods comprise at least one of 5G, LTE, wired Ethernet, or Wi-Fi, and
wherein the quality order is determined according to at least one of a communication speed, stability, or communication cost.

10. A display device comprising:
a plurality of communication modules different from each other, the plurality of communication modules corresponding to a plurality of communication methods, respectively;
a sensor configured to detect a user of the display device,
a memory configured to store at least one instruction; and
a processor configured to control the plurality of communication modules by executing the at least one instruction,
wherein the processor is configured to:
store a quality order for each of the plurality of communication modules in the memory;
based on a plurality of applications being executed at the same time, identify a priority order for each of the plurality of applications, wherein the plurality of applications include a first application with a first priority and a second application with a second priority lower than the first priority;
identify a communication method for each of the plurality of applications among the plurality of communication methods based on the priority order and the quality order; and
control the plurality of communication modules to communicate with a server corresponding to each of the plurality of applications by the identified communication method,
wherein the processor is further configured to control a communication module among the plurality of communication modules to communicate with the server by one communication method among the plurality of communication methods,
wherein the processor is further configured to, based on whether a user of the display device is present within a preset range of the display device, change the one communication method to another communication method among the plurality of communication methods, and
wherein the processor is further configured to:
identify a first communication method corresponding to the first application among the plurality of communication methods, the first communication method having a first quality, and identify a second communication method corresponding to the second application among the plurality of communication methods, the second communication method having a second quality lower than the first quality.

11. The device according to claim 10, wherein the processor is configured to, based on one application among the plurality of applications being executed, identify a communication method corresponding to a communication specification required by the executed one application among the plurality of communication methods, and perform communication by controlling a communication module corresponding to the identified communication method among the plurality of communication modules.

12. The device according to claim 10, wherein the processor is configured to identify the priority order for each of the plurality of applications based on types of the applications.

13. The device according to claim 10,
wherein the processor is configured to, based on the user being not present within the preset range from the display device, change the one communication method of the plurality of communication methods to the another communication method of the plurality of communication methods, and
wherein a quality order of the another communication method is lower than a quality order of the one communication method.

14. The device according to claim 13, wherein the processor is configured to maintain the one communication method based on the user being present within the preset range from the display device.

15. The device according to claim 10, further comprising a display,
wherein the processor is configured to:
control the display to display a UI for selecting a menu;
based on a multi-screen mode being selected from the UI, control the display to divide an entire display region of the display into a plurality of display regions and display execution screens of the plurality of applications on the plurality of display regions; and
identify the priority order of each of the plurality of applications by comparing sizes of the plurality of display regions with each other.

16. The device according to claim 10, further comprising a display,
wherein the processor is configured to:
control the display to display a UI for selecting a menu;
based on a multi-screen mode being selected from the UI, control the display to divide an entire display region of the display into a plurality of display regions and to display execution screens of the plurality of applications on the plurality of display regions; and
identify the priority order of each of the plurality of applications based on a control authority applied to a display region among the plurality of display regions.

17. The device according to claim 10, wherein the processor is configured to:
based on one application of the plurality of applications being executed, perform communication by identifying a communication method corresponding to a communication specification required by the executed one application among the plurality of communication methods; and
based on another application of the plurality of applications being additionally executed during the execution of the one application, compare a priority order of the another application with a priority order of the one application being executed, and determine a communication method of each of the one application and the another application according to the comparison result.

18. The device according to claim 10, wherein the plurality of communication modules comprise:
a connector configured to be connected to a dongle for 5G communication;
a wired Ethernet module; and
a Wi-Fi module,
wherein the processor is configured to, based on the dongle for 5G communication being connected to the connector, identify a quality order of each of the plurality of communication methods including a 5G communication method.

19. The device according to claim 10, wherein the plurality of communication methods comprise at least one of 5G, LTE, wired Ethernet, or Wi-Fi, and
wherein the processor is configured to identify the quality order according to at least one of a communication speed, stability, or communication cost.

20. A computer program product comprising a non-transitory computer-readable recording medium having recording thereon a program for performing a communication method of a display device, the method comprising:
storing a quality order for each of a plurality of communication methods different from each other;
based on a plurality of applications being executed at the same time, identifying a priority order for each of the plurality of applications, wherein the plurality of applications include a first application with a first priority and a second application with a second priority lower than the first priority;
identifying a communication method corresponding to each of the plurality of applications among the plurality of communication methods based on the priority order and the quality order; and
communicating with a server corresponding to each of the plurality of applications by the identified communication method,
wherein the communicating with the server comprises communicating with the server by one communication method among the plurality of communication methods,
wherein the method further comprises, based on whether a user of the display device is present within a preset range of the display device, changing the one communication method to another communication method among the plurality of communication methods, and
wherein the identifying of the communication method comprises:
identifying a first communication method corresponding to the first application among the plurality of communication methods, the first communication method having a first quality, and
identifying a second communication method corresponding to the second application among the plurality of communication methods, the second communication method having a second quality lower than the first quality.

21. The computer program product of claim 20, wherein the changing of the one communication method comprises:
identifying whether the user of the display device is present within the preset range of the display device; and
based on the user being not present within the preset range from the display device, changing the one communication method of the plurality of communication methods to the another communication method of the plurality of communication methods, and wherein a quality order of the another communication method is lower than a quality order of the one communication method.

* * * * *